(12) United States Patent
Niitsuma et al.

(10) Patent No.: US 8,020,930 B2
(45) Date of Patent: Sep. 20, 2011

(54) COUPLING MECHANISM FOR HEADREST OF VEHICLE SEAT

(75) Inventors: Kenichi Niitsuma, Tochigi-ken (JP);
Hirooki Negishi, Tochigi-ken (JP);
Jinichi Tanabe, Tochigi-ken (JP); Koji Sano, Saitama-ken (JP); Koji Uno, Saitama-ken (JP); Tatsuya Terauchi, Saitama-ken (JP); Tomoki Matsumoto, Saitama-ken (JP)

(73) Assignees: TS Tech Co., Ltd., Saitama (JP); Honda Giken Kogyo Kabushiki Kaisha, Tokyo (JP)

( * ) Notice: Subject to any disclaimer, the term of this patent is extended or adjusted under 35 U.S.C. 154(b) by 96 days.

(21) Appl. No.: 12/279,766

(22) PCT Filed: Jul. 22, 2005

(86) PCT No.: PCT/JP2005/013468
§ 371 (c)(1),
(2), (4) Date: Jun. 18, 2009

(87) PCT Pub. No.: WO2007/010616
PCT Pub. Date: Jan. 25, 2007

(65) Prior Publication Data
US 2009/0309398 A1 Dec. 17, 2009

(51) Int. Cl.
*B60N 2/42* (2006.01)
*B60N 2/427* (2006.01)
(52) U.S. Cl. .................................. 297/216.12
(58) Field of Classification Search ............. 297/216.12
See application file for complete search history.

(56) References Cited

U.S. PATENT DOCUMENTS

| 6,250,714 B1 * | 6/2001 | Nakano et al. | 297/216.12 |
| 6,789,845 B2 * | 9/2004 | Farquhar et al. | 297/216.12 |
| 6,955,397 B1 * | 10/2005 | Humer | 297/216.12 |
| 7,393,052 B2 * | 7/2008 | Humer et al. | 297/216.12 |
| 7,644,987 B2 * | 1/2010 | Humer et al. | 297/216.12 |
| 2004/0155496 A1 | 8/2004 | Farquhar et al. | |
| 2006/0006709 A1 * | 1/2006 | Uno et al. | 297/216.12 |

FOREIGN PATENT DOCUMENTS

| DE | 100 46 391 C1 | 4/2002 |
| DE | 102 12 828 C1 | 6/2003 |
| JP | 10-119619 A | 5/1998 |
| JP | 10-138811 A | 5/1998 |
| JP | 10-138812 A | 5/1998 |
| JP | 10138814 A | 5/1998 |
| JP | 2000211410 A | 8/2000 |

* cited by examiner

*Primary Examiner* — Rodney B White
(74) *Attorney, Agent, or Firm* — Drinker Biddle & Reath LLP

(57) ABSTRACT

A vehicle seat of the invention has an upper movable member (10) supporting a headrest (3), a lower movable member (30) provided inside a backrest, and a coupling mechanism for coupling the upper movable member and the lower movable member. The coupling mechanism includes an upper link mechanism (15) positioned in an upper part of a side frame (40) and coupled to the upper movable member, a lower link mechanism (32) positioned in a lower part of the side frame and coupled to the lower movable member, and a rod (27) extending along the side frame and coupling the upper link mechanism and the lower link mechanism. The upper link mechanism amplifies a backward moving amount of the lower movable member, and moves the headrest forward.

17 Claims, 6 Drawing Sheets

COUPLING MECHANISM FOR HEADREST OF VEHICLE SEAT

TECHNICAL FIELD

The present invention relates to a coupling mechanism for a headrest of a vehicle seat, and more particularly to a coupling mechanism for moving the headrest forward when a forward external force acts on a car body as a result of rear end collisions or the like.

BACKGROUND ART

Conventionally, there is known a vehicle seat having a headrest provided in a backrest, a movable member provided inside of the backrest, and a coupling mechanism for coupling the headrest and the movable member mechanically, in which when a vehicle seat occupant moves backward relatively to the vehicle seat due to rear collisions or the like, the movable member is pushed by the occupant to move backward, and the backward movement of the movable member moves the headrest forward by way of the coupling mechanism.

Patent document 1: JP Appln. Laid-Open No. 10-119619

DISCLOSURE OF THE INVENTION

The coupling mechanism of the prior art is disposed substantially at the backside of a cushion of the backrest, and thus the cushion performance may be lowered. That is, the coupling mechanism is provided at a position overlapping the vehicle seat occupant in the front-back direction, and thus the cushion design is restricted.

The movable member in the prior art is narrow in its movable range, and the distance of moving the headrest forward is short, and means for compensating for lack of distance was difficult.

It is hence an object of the invention to provide a coupling mechanism for a headrest capable of amplifying the small moving amount of the movable member and transmitting the movement to the headrest.

It is another object of the invention to provide a coupling mechanism for a headrest capable of amplifying the moving amount of the movable member with a simple configuration.

It is still another object of the invention to provide a coupling mechanism for a headrest not interfering with the cushion of the backrest substantially.

BEST MODE FOR CARRYING OUT THE INVENTION

Figure 1:
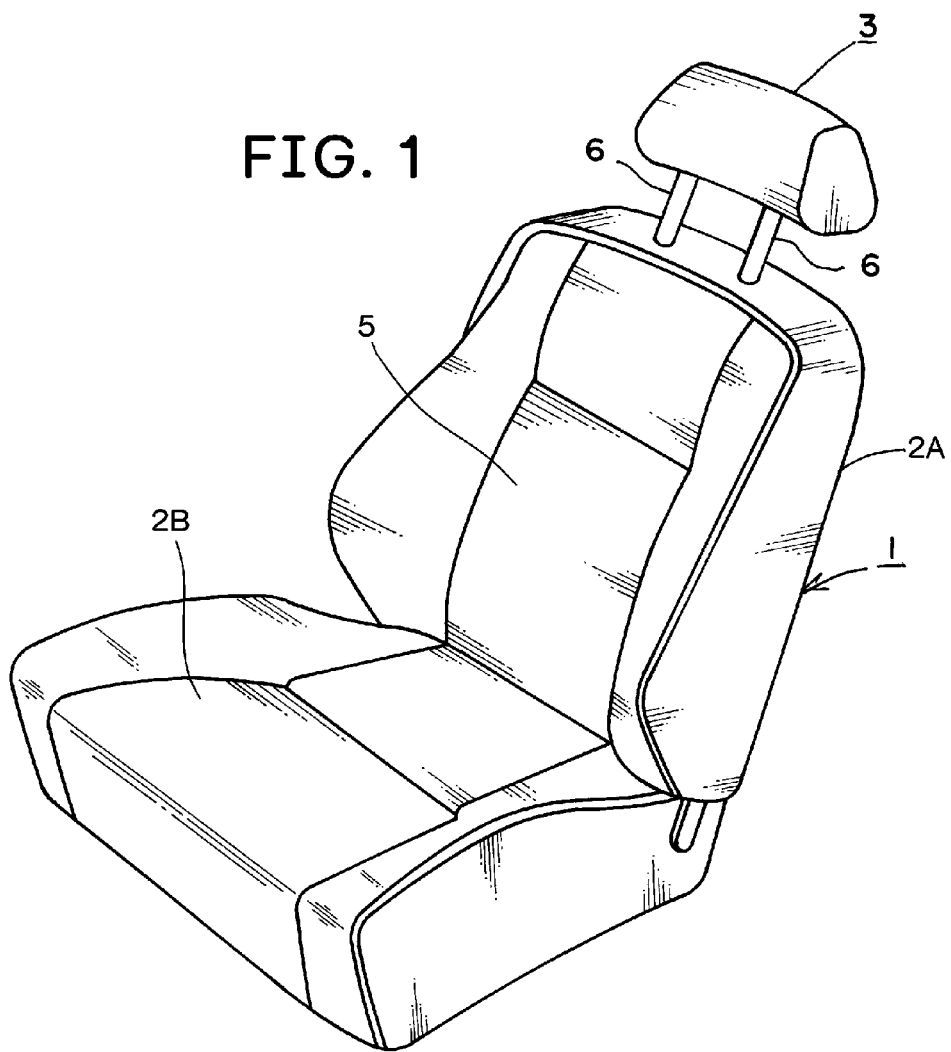
FIG. 1 is an overall perspective view of a vehicle seat.

An embodiment of the invention will be described with reference to the accompanying drawings. A vehicle seat 1 of the invention has a backrest 2A, a seat bottom 2B, and a headrest 3 provided in an upper part of the backrest 2A. A backrest frame 16 of the backrest 2A has a square frame shape, including a pair of side frames 40, an upper frame 41, and a lower frame 42.

Near the upper frame 41, an upper movable member 10 movable laterally to the backrest frame 16 is disposed. Vertical pillar supports 11 for inserting the lower parts of pillars 6 of the headrest 3 are fixed in the movable member 10. The pillars 6 are supported by the pillar supports 11 so as to be adjustable in height.

Figure 2:
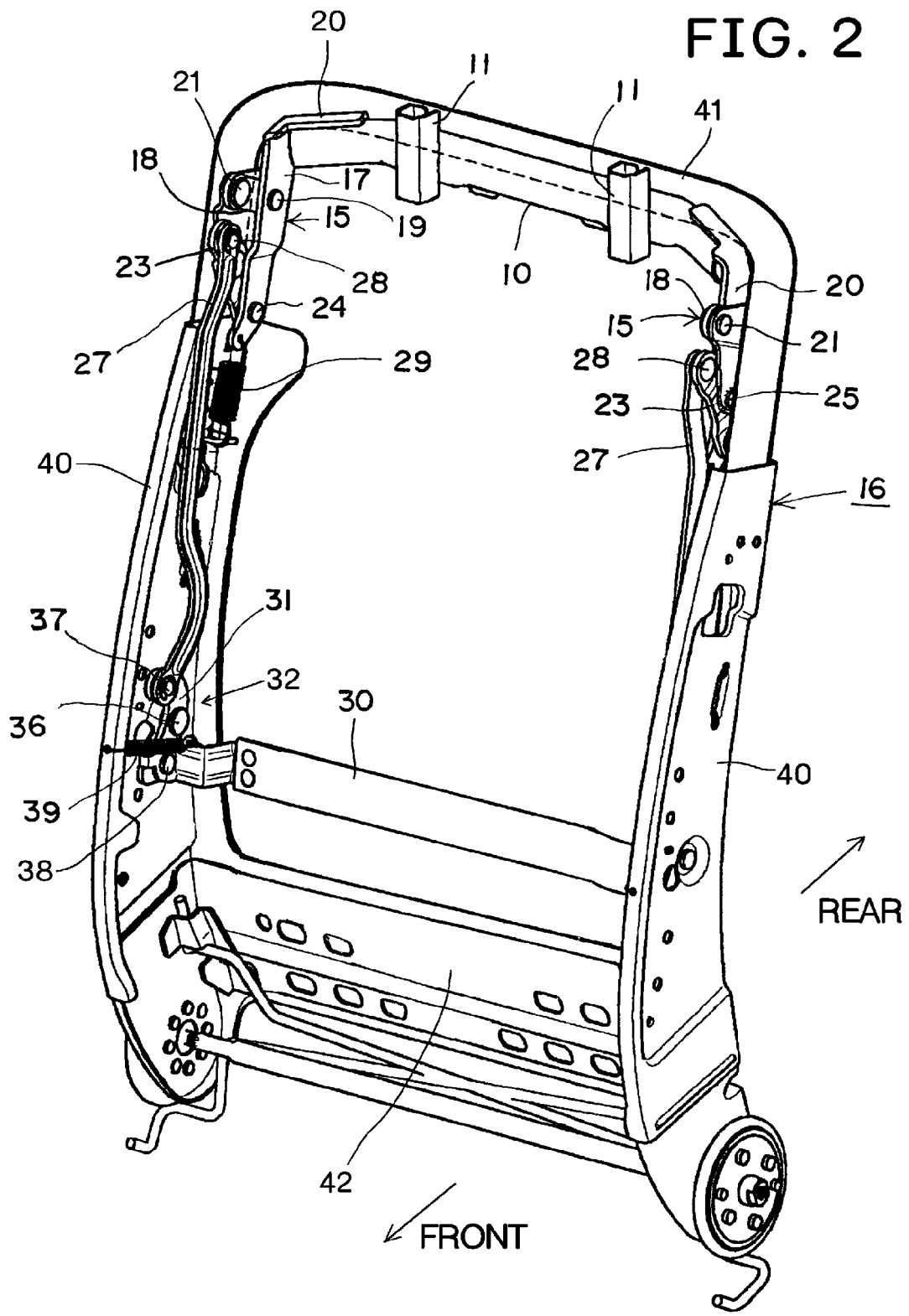
FIG. 2 is a perspective view showing a backrest frame and a part of a coupling mechanism for a headrest.
Figure 3:
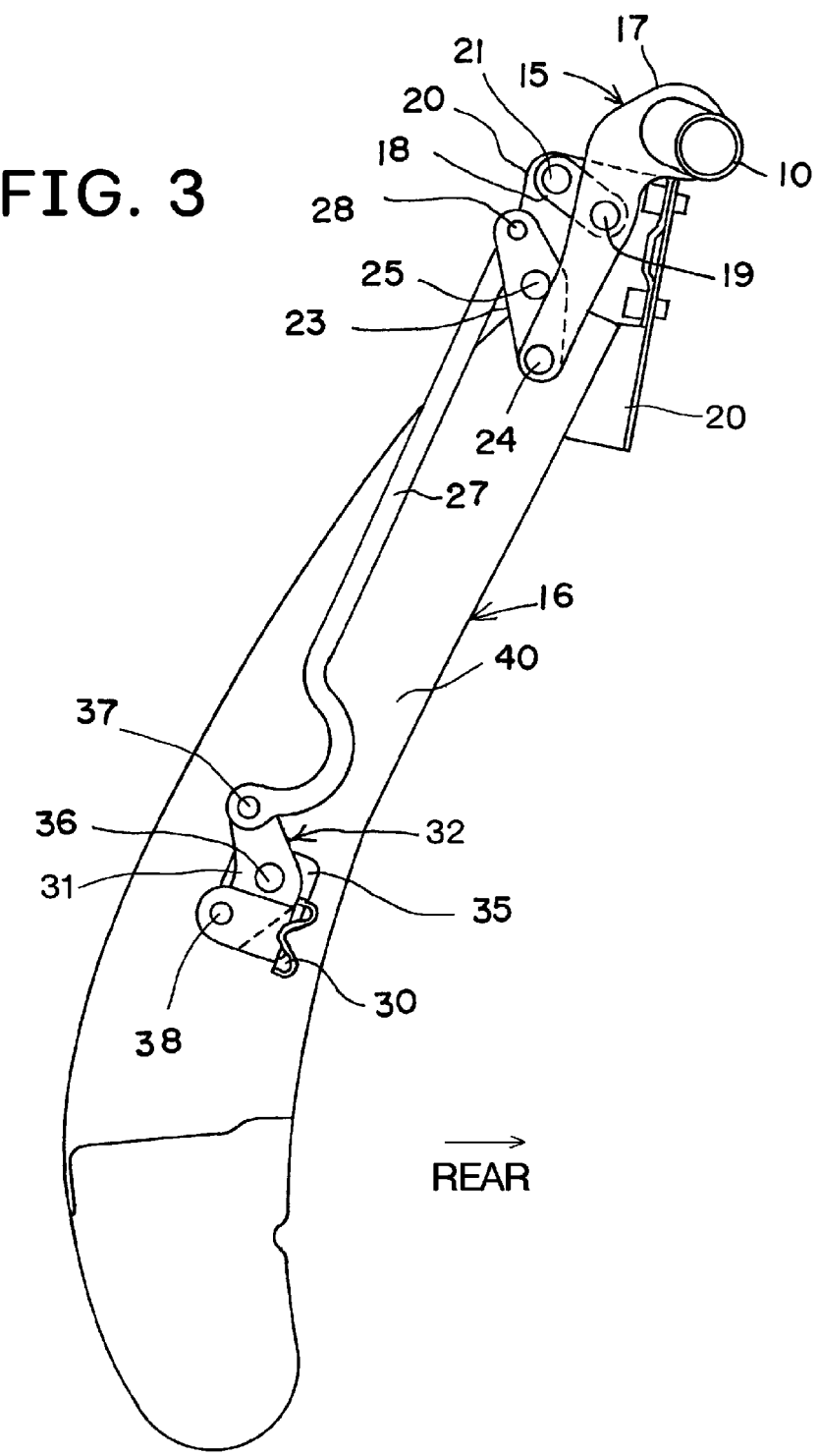
FIG. 3 is a side view of the coupling mechanism for a headrest.
Figure 4:
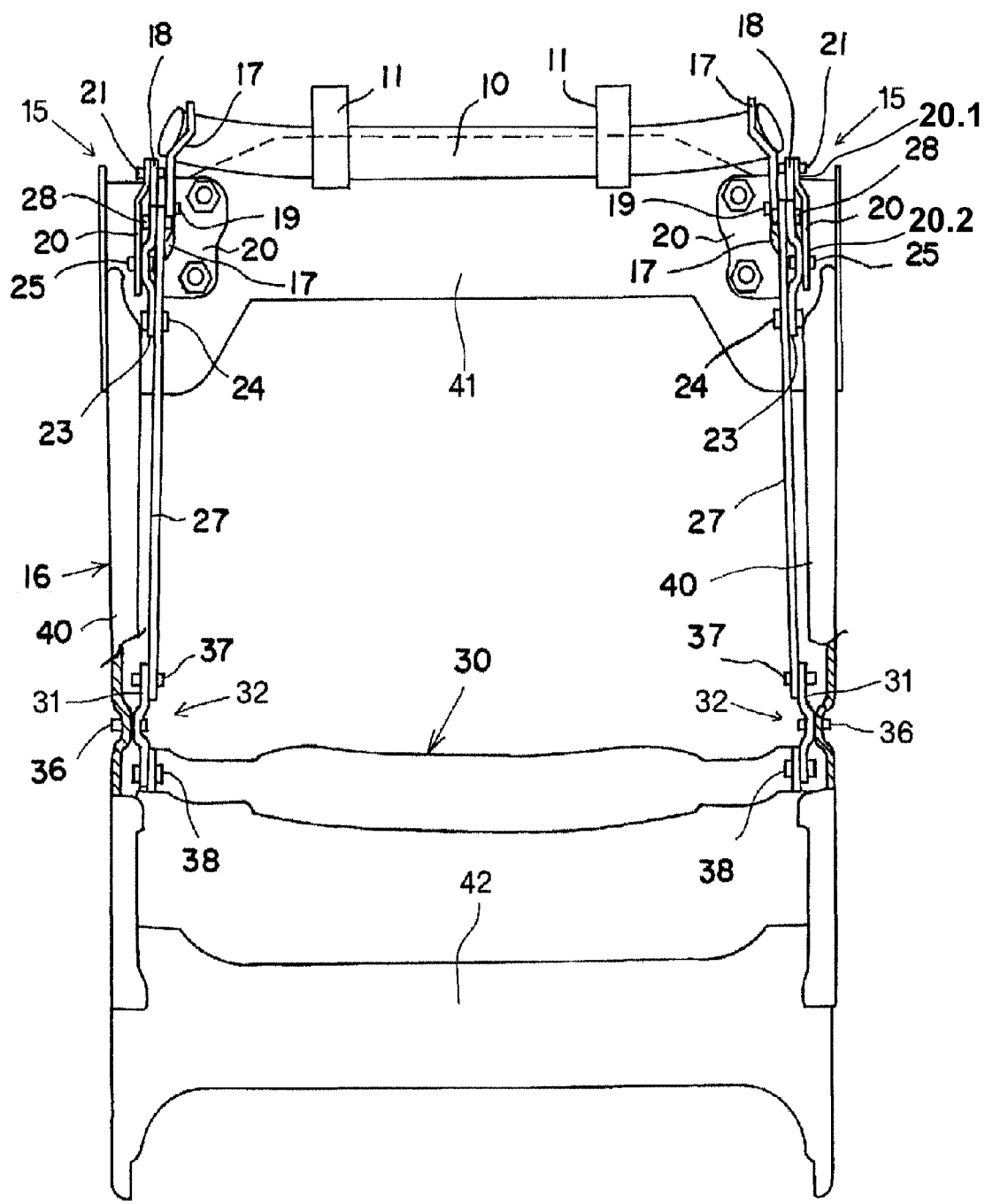
FIG. 4 is a front view of the backrest frame and the coupling mechanism for a headrest.
Figure 7:
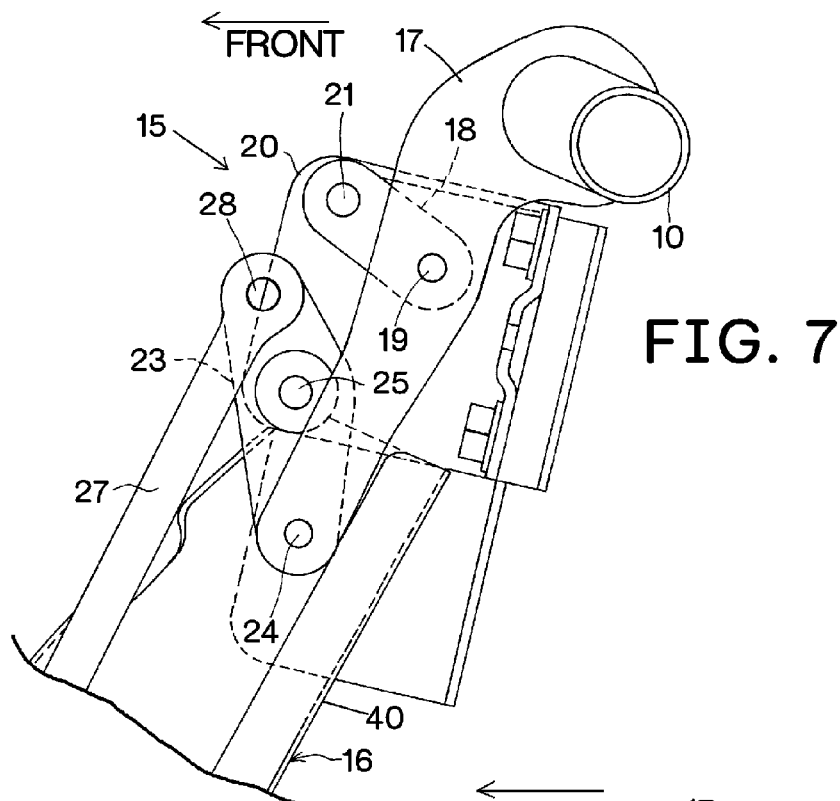
FIG. 7 is a magnified side view of an upper link mechanism of the coupling mechanism.

Both right and left sides of the upper movable member 10 are attached to the backrest frame 16 by way of an individual upper link mechanism 15. Each upper link mechanism 15 has a long first link 17, an arm 18, and a second link 23 as shown in FIGS. 2, 3 and 7. The end part of the upper movable member 10 is fixed to an upper part of the first link 17, and the arm 18 is rotatably pivoted on an L-shaped bracket 20 fixed in the upper part of the backrest frame 16 by means of an arm support shaft 21 that is supported by a first support portion 20.1 of the bracket 20. The second link 23 is rotatably pivoted on the bracket 20 by means of a link support shaft 25 that is supported by a second support portion 20.2 of the bracket. The leading end of the arm 18 is pivoted on the vertical intermediate position of the first link 17 by means of a shaft 19, and the leading end of the second link 23 is pivoted on the lower part of the first link 17 by means of a shaft 24. The other end of the second link 23 is pivoted on the upper part of a long coupling rod 27 by means of a shaft 28.

The first link 17, the arm 18 and the second link 23 of the upper link mechanism 15 are preliminarily assembled in, preferably, the bracket 20. As a result, the bracket provided with the link mechanism can be easily assembled in the backrest frame 16 as a unit module. The bracket provided with the link mechanism makes it easy to manage storage parts, and to replace parts in maintenance works.

Figure 6:
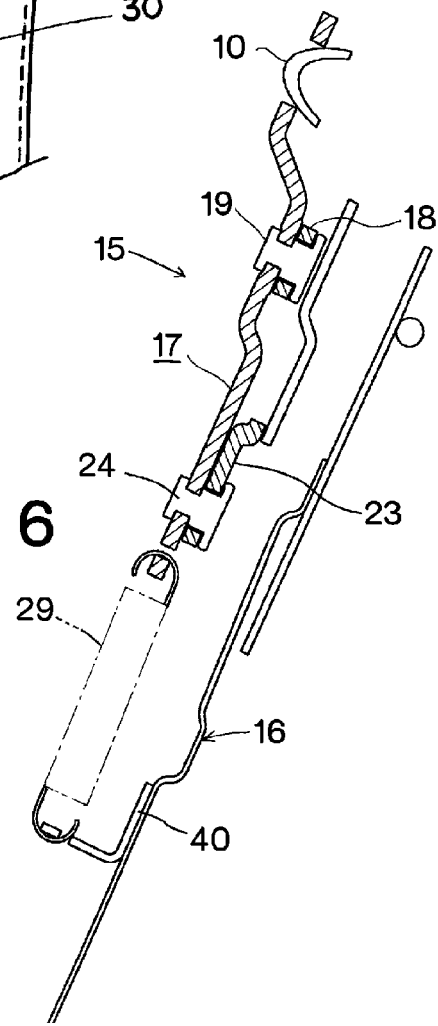
FIG. 6 is a sectional view of a first link of the coupling mechanism.

As shown in FIGS. 2 and 6, one end of an upper spring 29 is coupled to the lower part of the first link 17, and the other end of the upper spring 29 is coupled to the side frame 40. The first link 17 is usually held at a lower waiting position in FIG. 7 by an elastic force of the spring 29, and hence the headrest 3 is held at an ordinary position. When the first link 17 moves up to a position indicated by solid line in FIG. 8, the upper movable member 10 moves forward, and the headrest 3 is forced out forward.

Between the side frames 40, 40, a lower movable member 30 stretching laterally is disposed. The lower movable member 30 is pushed by a vehicle seat occupant and moved backward when the vehicle seat relatively moves forward of the occupant due to a rear end collision. The both sides of the lower movable member 30 are coupled to the ends of the lower link 31 of the lower link mechanism 32 by means of shafts 38, and the other end of the lower link 31 is coupled to the lower part of the coupling rod 27 by means of a shaft 37. The lower link 31 is preferably a bell crank. The center of the lower link 31 is pivoted on the lower bracket 35 fixed to the side frame 40 by means of a shaft 36.

As shown in FIG. 2, one end of the lower spring 39 is coupled to the lower movable member 30, and the other end of the lower spring 39 is coupled to the side frame 40. The lower movable member 30 is held at a forward ordinary position by the elastic force of the spring 39, and when a rear end collision occurs, it is pushed by the vehicle seat occupant and moved backward by resisting the elastic force of the spring 39.

Figure 5:
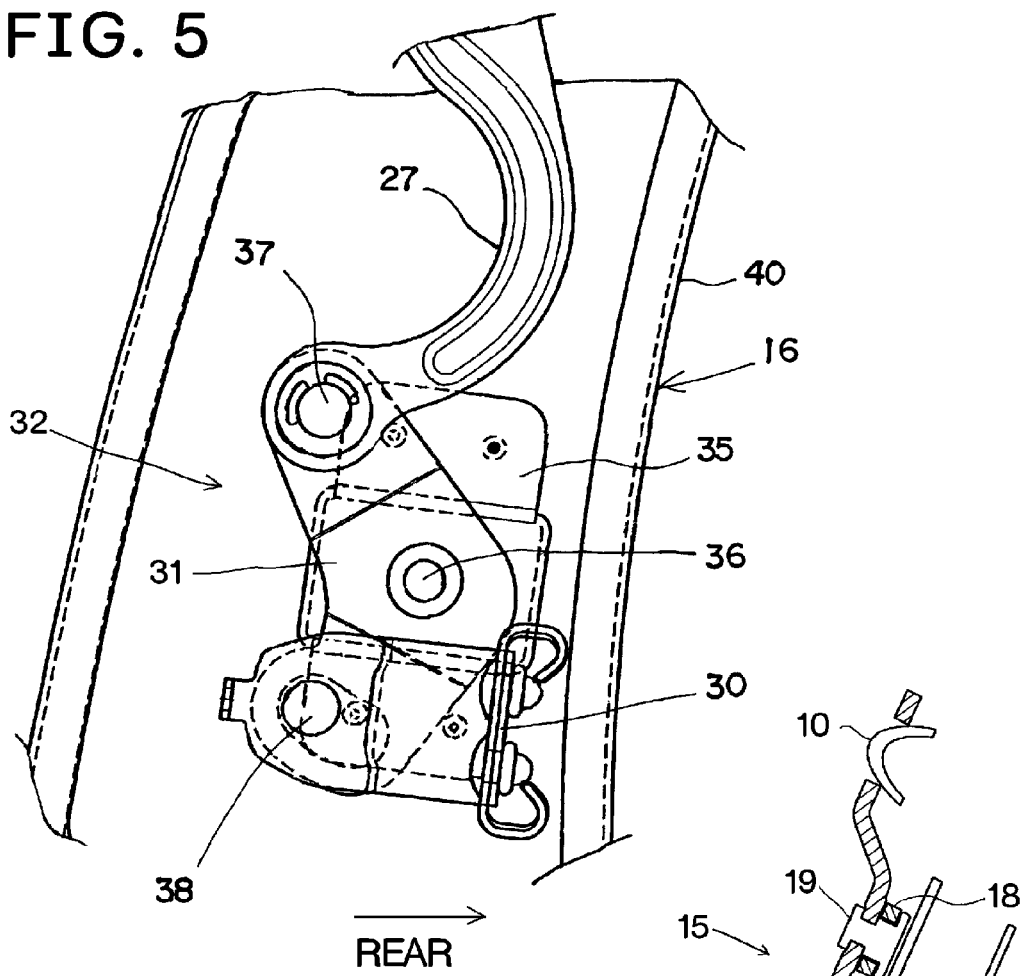
FIG. 5 is a magnified side view of a lower link mechanism of the coupling mechanism.
Figure 8:
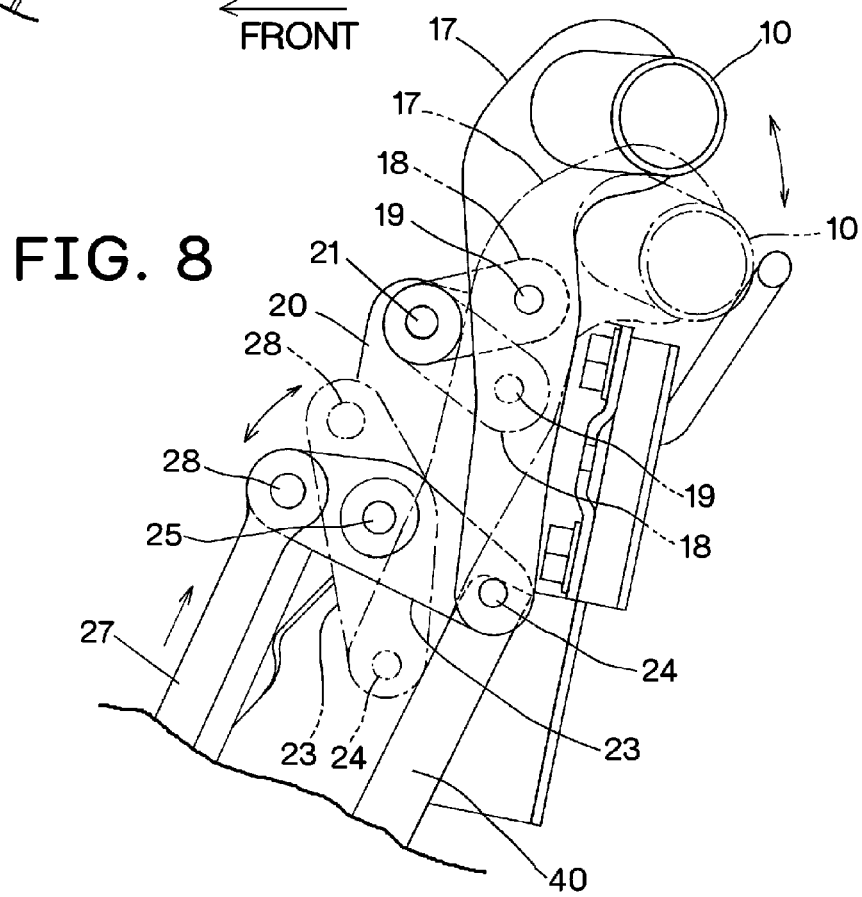
FIG. 8 is a magnified side view showing the first link elevated from the state in FIG. 7.

In FIGS. 3 and 5, the backward movement of the lower movable member 30 causes the lower link 31 to rotate counterclockwise about the shaft 36, and causes the coupling rod 27 to be pulled downward. As a result, the second link 23 rotates counterclockwise about the shaft 25, and moves the first link 17 upward by resisting the elastic force of the upper spring 29. At this time, the distance between the shaft 25 and shaft 28 is shorter than the distance between the shaft 25 and shaft 24. Thus, the second link 23 amplifies the moving amount of the coupling rod 27 (lower movable member 30) to transmit the movement to the first link 17, the upper part of the first link 17 is guided by the arm 18 and moved substantially forward as shown in FIG. 8, and thereby the headrest 3 is moved forward by way of the upper movable member 10 so that a cervical spine of the vehicle seat occupant is protected in the event of a rear end collision.

Thus, the upper link mechanism 15 of the invention has a function of moving the headrest 3 largely forward with a small moving amount of the lower movable member 30.

The side frame 40 of the backrest frame 16 is formed of a metal plate having a specified width in the front-back direction, and the upper link mechanism 15, coupling rod 27, and lower link 31 are disposed adjacently to the side frame 40. In addition, the members of the upper link mechanism 15 and the lower link 31 are formed of plates substantially parallel to the side frame 40, and are supported by the shaft in the lateral direction. The upper movable member 10 substantially overlaps with the upper frame 41 of the backrest frame 16. Therefore, the mechanism for transmitting the movement of the lower movable member 30 to the headrest 3 does not substantially interfere with the cushion 5 of the backrest 2A. Hence, the transmission mechanism is operated smoothly, and decline of performance of the cushion 5 is prevented.

The invention claimed is:

1. A coupling mechanism for a headrest of a vehicle seat, comprising:
   a backrest frame;
   a headrest;
   a lower movable member attached movably to the backrest frame so as to be movable backward as a result of a rear end collision;
   an upper movable member attached movably to the backrest frame for supporting the headrest; and
   a coupling mechanism for transmitting a backward movement of the lower movable member to the upper movable member,
   wherein the coupling mechanism includes a pair of upper link mechanisms coupled to right and left ends of the upper movable member, and a pair of lower link mechanisms coupled to right and left ends of the lower movable member,
   the lower link mechanisms are coupled to the upper link mechanisms by way of a coupling rod, and
   the upper link mechanisms amplify a backward moving amount of the lower movable member, and move the headrest forward;
   wherein each upper link mechanism has a first long link having an upper end part for fixing an end part of the upper movable member, an arm pivoted on the backrest frame and coupled to an intermediate part of the first long link, and a second link pivoted on the backrest frame and having a first end part to be coupled to a lower end part of the first long link by means of a first shaft, and wherein an upper end of the coupling rod is coupled to a second end part of the second link by way of a second shaft.

2. The coupling mechanism for a headrest of a vehicle seat according to claim 1, wherein each lower link mechanism has a lower link that is a bell crank, a first end part of the lower link is coupled to the end part of the lower movable member, and a second end part of the lower link is coupled to the lower end of the coupling rod.

3. The coupling mechanism for a headrest of a vehicle seat according to claim 1, wherein each member of the upper link mechanism and the lower link mechanism are disposed adjacently to the side frame of the backrest frame.

4. The coupling mechanism for a headrest of a vehicle seat according to claim 3, wherein the side frame is formed in a plate having a specified width in a front-back direction, and wherein each member of the upper link mechanism and the lower link mechanism are formed in a plate parallel to the side frame.

5. The coupling mechanism for a headrest of a vehicle seat according to claim 1, wherein a downward moving of the coupling rod moves the headrest forward.

6. The coupling mechanism for a headrest of a vehicle seat according to claim 1, wherein an arm support shaft for pivoting the arm on the backrest frame is disposed in front of the first long link.

7. The coupling mechanism for a headrest of a vehicle seat according to claim 1, wherein an arm support shaft for pivoting the arm on the backrest frame, and a link support shaft for pivoting the second link on the backrest frame are disposed at a same side of the first long link in a front-to-back direction.

8. The coupling mechanism for a headrest of a vehicle seat according to claim 1, wherein a link support shaft for pivoting the second link on the backrest frame is disposed between the first shaft and the second shaft.

9. The coupling mechanism for a headrest of a vehicle seat according to claim 1, wherein the arm is pivoted on the backrest frame by way of an arm support shaft, and the arm support shaft is supported on a bracket fixed to the backrest frame.

10. The coupling mechanism for a headrest of a vehicle seat according to claim 1, wherein the second link is pivoted on the backrest frame by way of a link support shaft, and the link support shaft is supported on a bracket fixed to the backrest frame.

11. The coupling mechanism for a headrest of a vehicle seat according to claim 1, wherein the arm is pivoted on the backrest frame by way of an arm support shaft, the second link is pivoted on the backrest frame by way of a link support shaft, and the arm support shaft and the link support shaft are supported on a common bracket fixed to the backrest frame.

12. The coupling mechanism for a headrest of a vehicle seat according to claim 1, wherein the first long link is disposed inside the coupling rod in a lateral direction towards a seat center.

13. The coupling mechanism for a headrest of a vehicle seat according to claim 1, wherein the arm is disposed outside the coupling rod in a lateral direction towards a seat edge.

14. The coupling mechanism for a headrest of a vehicle seat according to claim 1, wherein the second link is disposed outside the coupling rod in a lateral direction towards a seat edge.

15. The coupling mechanism for a headrest of a vehicle seat according to claim 1, further comprising a bracket fixed to the backrest frame, and
   wherein the bracket includes a first support portion for supporting an arm support shaft on the bracket, the arm support shaft pivoting the arm on the backrest frame and a second support portion for supporting a link support shaft on the bracket, the link support shaft pivoting the second link on the backrest frame, and wherein the first support portion and the second support portion are disposed outside the arm in a lateral direction towards a seat edge.

16. The coupling mechanism for a headrest of a vehicle seat according to claim 1, further comprising a bracket fixed to the backrest frame, and wherein the bracket includes a first support portion for supporting an arm support shaft on the bracket, the arm support shaft pivoting the arm on the backrest frame and a second support portion for supporting a link support shaft on the bracket, the link support shaft pivoting the second link on the backrest frame, wherein the first support portion and the second support portion are disposed outside the arm in a lateral direction towards a seat edge, and wherein the second support portion are disposed outside the second link in a lateral direction towards the seat edge.

17. The coupling mechanism for a headrest of a vehicle seat according to claim 1, further comprising a lower link coupled to a lower end of the coupling rod, wherein the lower link is disposed outside the coupling rod in a lateral direction towards the seat edge.

* * * * *